United States Patent
Thacker et al.

[19]

[11] Patent Number: 5,906,120
[45] Date of Patent: May 25, 1999

[54] AUTOMOTIVE VEHICLE STEERING COLUMN LOCK MECHANISM

[75] Inventors: Clarke Fisk Thacker, Farmington Hills; Robert Daniel Restauri, Madison Heights, both of Mich.

[73] Assignee: Ford Global Technologies, Inc., Dearborn, Mich.

[21] Appl. No.: 09/058,310

[22] Filed: Apr. 9, 1998

[51] Int. Cl.[6] ................................................. B60R 25/02
[52] U.S. Cl. ................................ 70/186; 70/183; 70/184; 70/245; 70/252
[58] Field of Search ........................... 70/182–187, 245, 70/252

[56] References Cited

U.S. PATENT DOCUMENTS

| | | | |
|---|---|---|---|
| 1,400,507 | 12/1921 | Addis . | |
| 1,487,863 | 3/1924 | Lavigne . | |
| 3,132,503 | 5/1964 | Pieck et al. | 70/252 |
| 3,572,067 | 3/1971 | Kimberlin | 70/252 |
| 3,638,462 | 2/1972 | White et al. | 70/252 |
| 3,703,092 | 11/1972 | Elliott . | |
| 3,791,182 | 2/1974 | Oxley et al. . | |
| 5,050,411 | 9/1991 | Kawachi et al. | 70/245 |
| 5,052,509 | 10/1991 | Dzioba | 70/245 |
| 5,172,576 | 12/1992 | Milton . | |
| 5,265,487 | 11/1993 | Williams et al. . | |

FOREIGN PATENT DOCUMENTS

3611-483-C  5/1986  Germany .

*Primary Examiner*—Steven Meyers
*Assistant Examiner*—Teri Pham
*Attorney, Agent, or Firm*—David B. Kelley

[57] ABSTRACT

An automotive vehicle steering column lock assembly is disclosed for use with a steering wheel connected to a steering column passing through a steering column housing to which an ignition switch is mounted. The assembly has a lock ring adapted to be mounted to the steering column and having at least one lock recess on an end thereof and a lock pawl movable between a lock position engaged in the lock recess and an unlock position disengaged from the at least one lock recess. A tray is adapted for slidable movement within the steering column housing generally parallel to the steering column, the tray having a lock pawl bed allowing the lock pawl to slide therein generally parallel to the steering column. Tray control means operatively connecting the ignition switch and the tray move the tray between at least two positions in which the lock pawl alternately engages and disengages the lock ring to prevent and allow, respectively, rotation of the steering column. A lock lever, fixed with respect to the steering column housing, is movable between a blocking position preventing the lock pawl from moving into the at least one lock recess on the lock ring, and an unblocking position allowing the lock pawl to enter the at least one lock recess. To control operation of the lock lever relative to a key inserted state of the ignition switch, a control lever operatively connects the ignition switch with the lock lever and is moveable between a release position when a key is inserted into the ignition switch allowing the lock lever to move to the block position, and a depress position when the key is removed from the ignition switch forcing the lock lever to an unblock position to allow the lock pawl to move to the locked position.

11 Claims, 8 Drawing Sheets

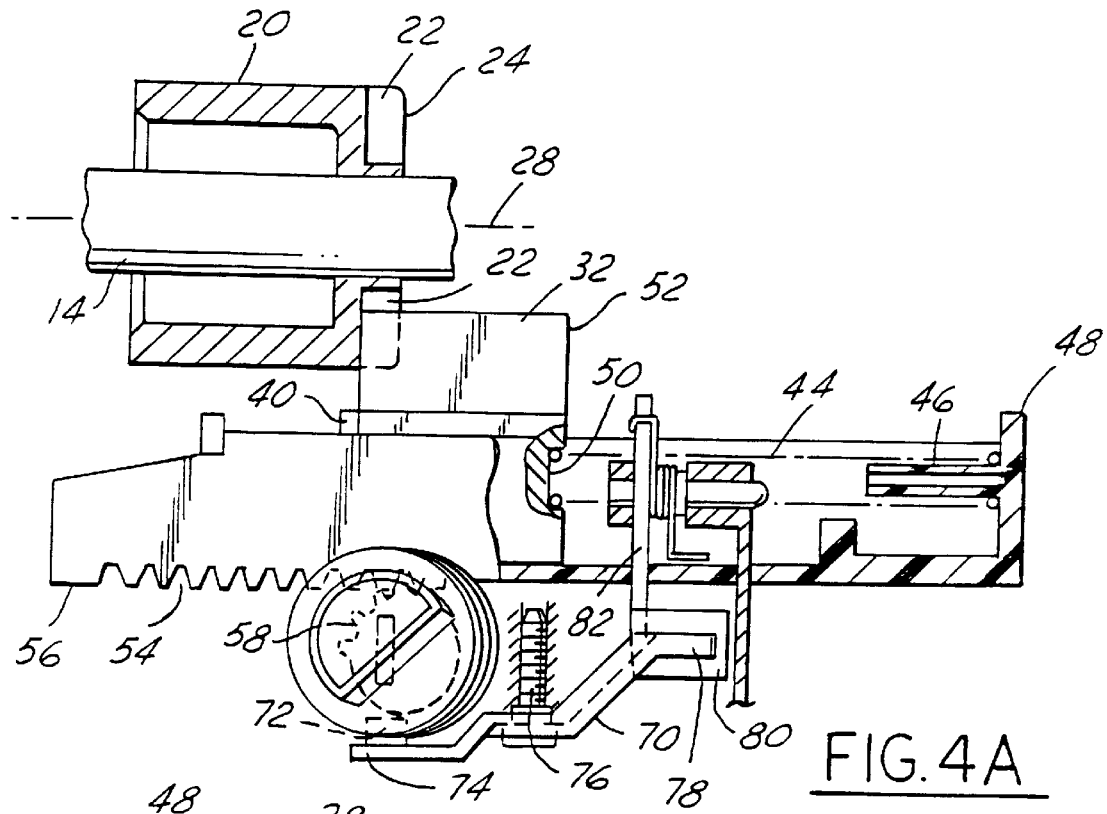
FIG.4A
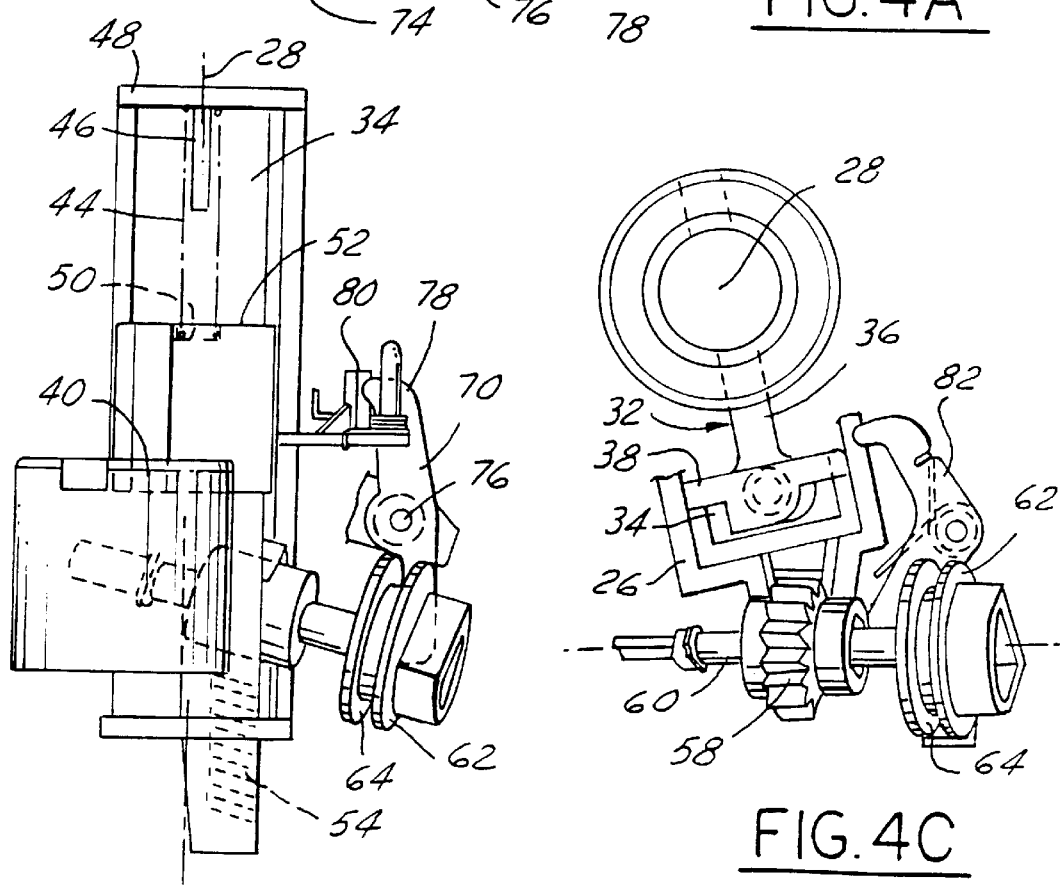
FIG.4B
FIG.4C

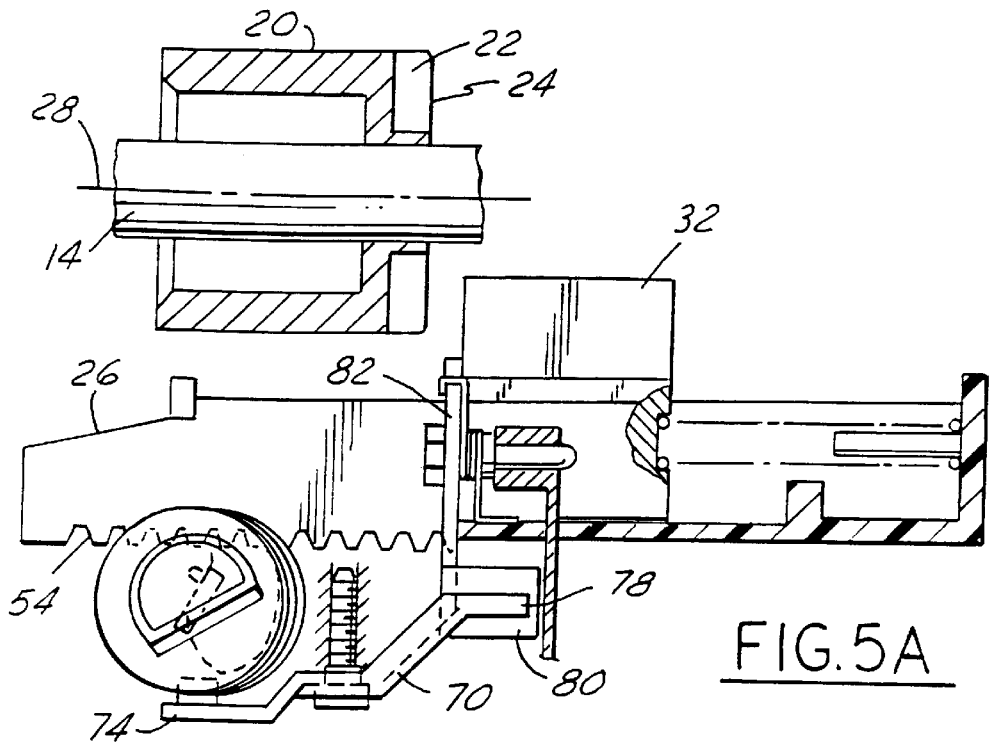
FIG.5A
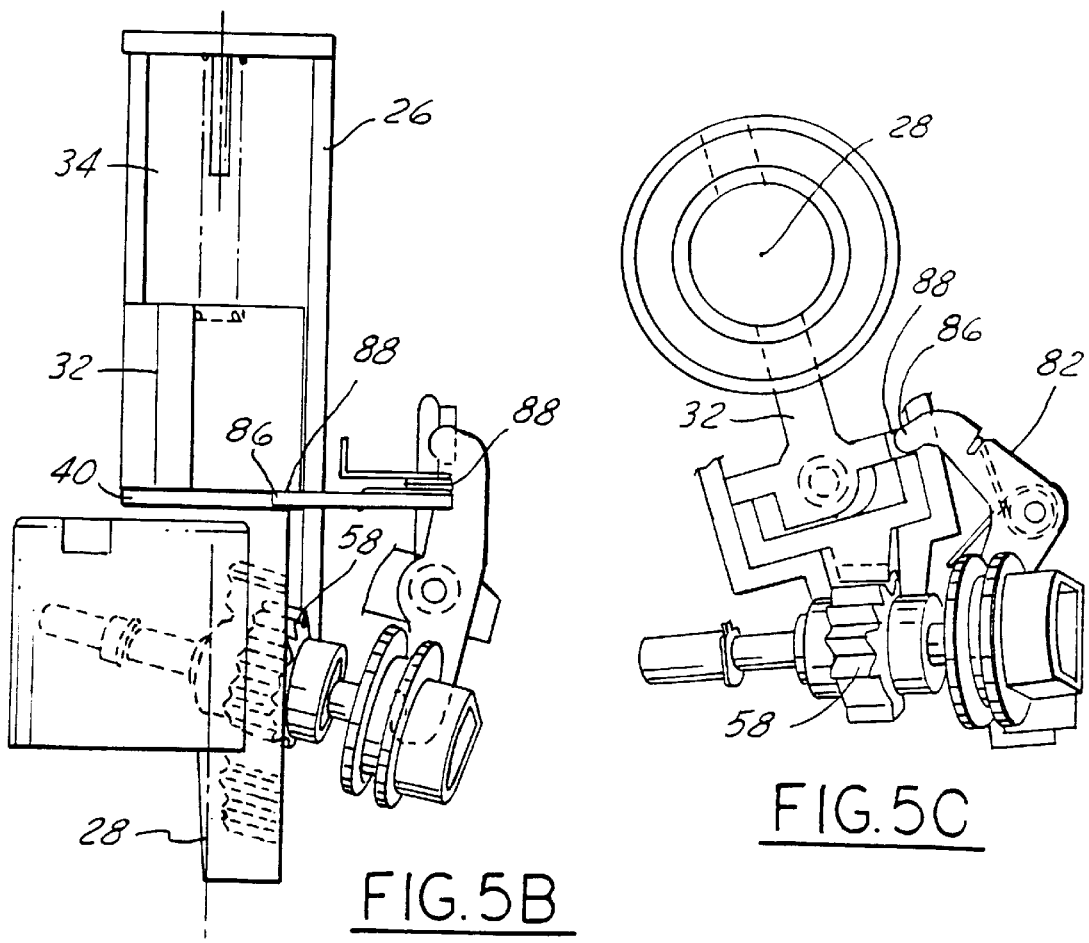
FIG.5B
FIG.5C

AUTOMOTIVE VEHICLE STEERING COLUMN LOCK MECHANISM

FIELD OF THE INVENTION

The present invention relates to automotive steering columns in general, and more specifically to steering column lock mechanisms.

BACKGROUND OF THE INVENTION

It is known to provide a lock mechanism for an automotive vehicle steering column to prevent rotation of the steering wheel under certain circumstances, for example, to deter to vehicle theft when not in use. Various steering column lock mechanism have been disclosed which use an ignition switch actuated rack and pinion drive to prevent rotation of a steering column. Early examples of such devices include the mechanisms disclosed in U.S. Pat. No. 1,400,507 (Addis) and U.S. Pat. No. 1,487,863 (Lavigne), which use the rack of a rack-and-pinion drive to act directly on the steering column to prevent steering column rotation. A more recent example of steering column lock technology is shown in U.S. Pat. No. 5,265,487 (Williams et al.), assigned to the assignee of the present invention, which uses a steering wheel mounted ignition to reciprocate a rack by a pinion connected to a key cylinder. Another steering column locking device, disclosed in U.S. Pat. No. 5,172,576 (Milton), rotates a pinion by a steering column support ignition to actuate a rack. A second rack attached to the first rack rotates a control gear which, in turn, actuates a clutch connected to the steering column.

SUMMARY OF THE INVENTION

The present invention is a new and improved steering column lock assembly which provides steering column shaft locking upon key removal with the ignition switch in the lock position. The steering column lock assembly is typically used for an automotive vehicle having a steering wheel connected to a steering column passing through a steering column housing to which an ignition switch is mounted. The assembly has a lock ring adapted to be mounted to the steering column and having at least one lock recess on an end thereof and a lock pawl movable between a lock position engaged in the lock recess and an unlock position disengaged from the at least one lock recess. A tray is adapted for slidable movement within the steering column housing generally parallel to the steering column, the tray having a lock pawl bed allowing the lock pawl to slide therein generally parallel to the steering column. Tray control means operatively connecting the ignition switch and the tray move the tray between at least two positions in which the lock pawl alternately engages and disengages the lock ring to prevent and allow, respectively, rotation of the steering column. A lock lever, fixed with respect to the steering column housing, is movable between a blocking position preventing the lock pawl from moving into the at least one lock recess on the lock ring, and an unblocking position allowing the lock pawl to enter the at least one lock recess. To control operation of the lock lever relative to a key inserted state of the ignition switch, a control lever operatively connects the ignition switch with the lock lever and is moveable between a release position when a key is inserted into the ignition switch allowing the lock lever to move to the block position, and a depress position when the key is removed from the ignition switch forcing the lock lever to an unblock position to allow the lock pawl to move to the locked position.

An advantage of the present invention is steering column lock assembly which provides positive containment of a steering column lock pawl.

Another advantage is a steering column lock assembly which prevents shaft locking with a key inserted into the ignition switch regardless of switch position.

Still another advantage of the present invention is a steering column lock assembly in which the steering column shaft is locked when a key is removed from the ignition switch by disengaging positive containment of the lock pawl.

A feature of the present invention is a pair of levers pivotally mounted to the steering column housing for providing positive containment of the lock pawl relative to a key inserted or removed state of the ignition switch.

BRIEF DESCRIPTION OF THE DRAWINGS

These and other objects, advantages, and features of the present invention will be apparent to those skilled in the arts upon reading the following description with reference the accompanying drawings, in which:

FIGS. 4A, 4B, 4C, and 4D are side, plan, end and plan views, respectively, of a steering column lock assembly according to the present invention shown when the ignition switch is in a key removal position without a key therein;

FIGS. 5A, 5B, 5C, and 5D are side, plan, end and plan views, respectively, of a steering column lock assembly according to the present invention shown with the ignition switch in an off position;

DETAILED DESCRIPTION OF THE PREFERRED EMBODIMENT

Figure 1:
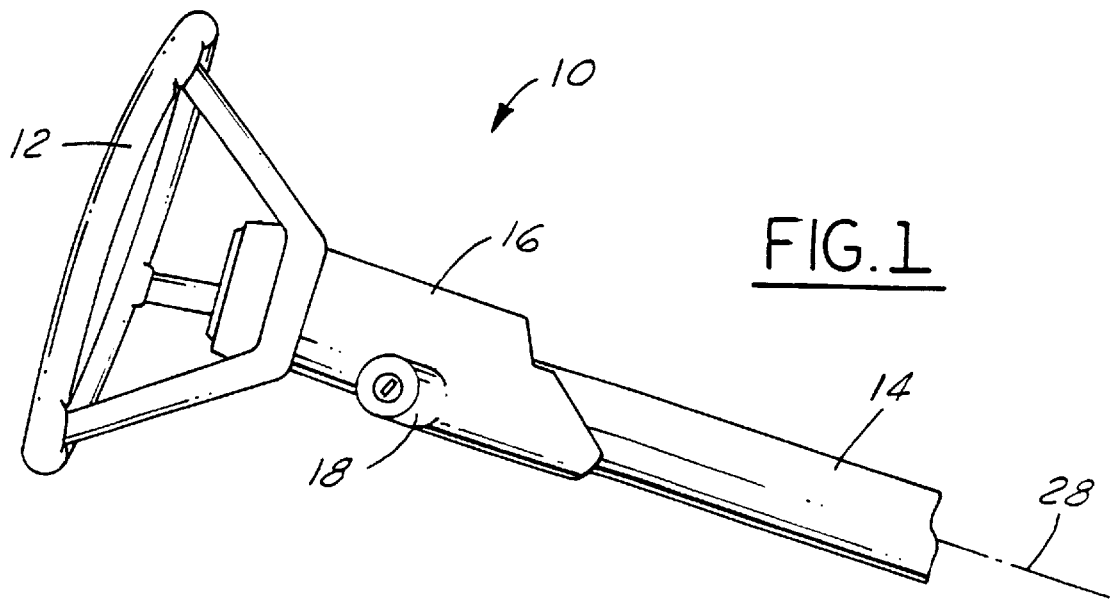
FIG. 1 is a side view of a steering column assembly for an automotive vehicle.

Turning now to the drawings, and in particular to FIG. 1 thereof, an automotive steering wheel assembly 10 is shown having a steering wheel 12 connected to a steering column 14. The steering column 14 passes through a steering column housing 16, which is shown partially cut away for illustrating passage of the steering column 14 therethrought. Attached to the steering column housing 16 is an ignition switch assembly 18, which is commonly done in automotive vehicles.

Figure 2:
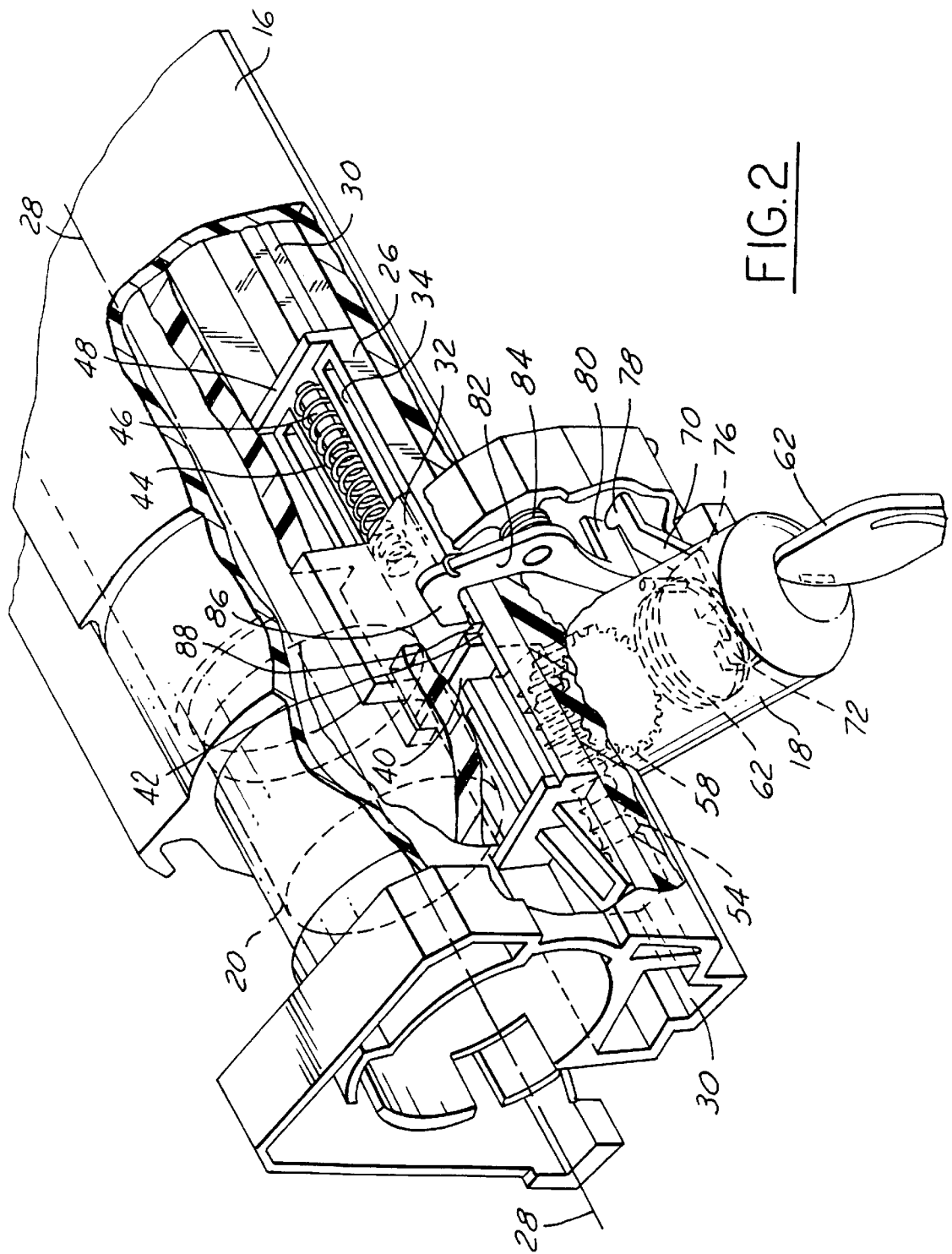
FIG. 2 is a perspective view of a steering column lock assembly according to an embodiment of the present invention.

Referring now to FIG. 2, a steering column lock assembly according to the present invention is shown in a perspective view. As those skilled in the art understand, and as described above, it is desirable to provide a steering column lock mechanism in an automobile to deter vehicle thief by preventing steering control when a key is removed from the ignition switch. As best seen in FIG. 4A, a lock ring 20 is mounted to the steering column 14 for rotatable movement therewith. The lock ring 20 has at least one lock recess 22 on an end face 24.

There can be, however, two or more lock ring recesses, as seen in FIG. 4A. As seen in FIG. 2, a tray 26 is mounted for slidable movement within the steering column housing 16 between several positions generally parallel to a steering column axis 28. The tray 26 may slide in a tract 30 which may be formed as part of the steering column housing 16 (FIG. 2). The tray 26 has a lock pawl 32 slidably disposed in a lock pawl bed 34 for movement generally parallel to the steering column axis 28. In a preferred embodiment of the present invention, the lock pawl 32 has a lock recess engaging member 36 substantially perpendicular to a lock pawl bed sliding member 38 (FIGS. 2 and 4C). The lock pawl 32 is bias toward a stop member 40 at a first end 42 of the tray 26 by a coil spring 44 (FIGS. 2, 4A, and 4B). The coil spring 44 is mounted around a spring post 46 extending from a second end 48 of the tray 26 and is received in a spring recess 50 on a spring post facing surface 52 of the lock pawl 32 (FIGS. 2, 4A and 4B). The lock pawl 32, although carried with the tray 26, can slide relative thereto in the lock pawl bed 34.

The tray 26 has a rack of teeth 54 along a bottom edge 56 (FIG. 4A). The teeth 54 engage an ignition switch gear 58 mounted around an ignition actuator rod 60 (FIG. 4C) so that rotation of the rod 60 by a key 62 inserted into the ignition switch 18 (FIG. 2) rotates the gear 58 thus converting rotational motion of the ignition switch into translational motion of the tray 26 end rack-and-pinion fashion (FIGS. 2, 4A–4C).

Also connected around the ignition switch actuator rod 60 is a collar 62 having an annular groove 64 circumferentially therearound (FIGS. 4B and 4C). As best seen in FIGS. 4B and 5B, the collar 62 is moveable axially along the longitudinally axis 66 of the rod 60 between a key removed state (FIG. 4B) and which the rod 60, and thus the collar 62, is biased away from the tray 26 by a ignition switch spring 68, and a key inserted state (FIG. 5B) in which the rod 60 and thus the collar 62, are moved toward the tray 26 to overcome the bias force of the spring 68 by insertion of a key (not shown) into the ignition switch 18.

Figure 4D:
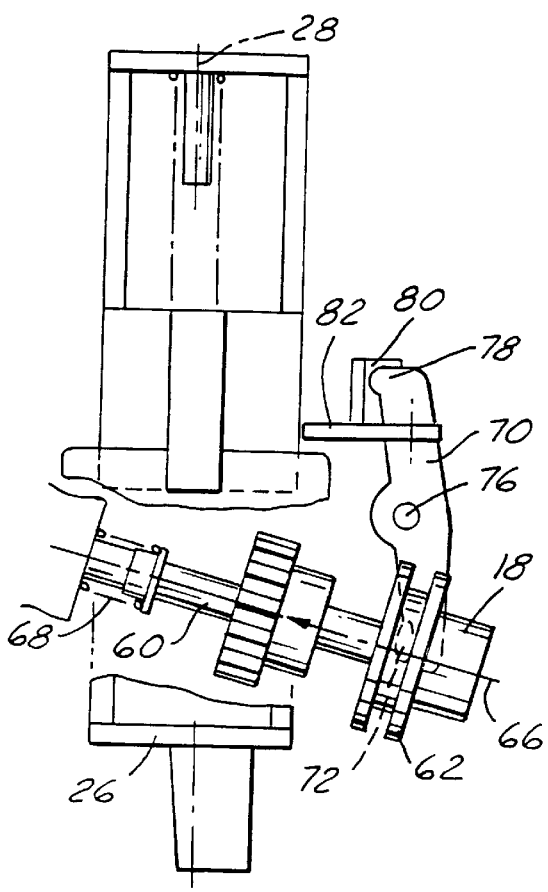

Operatively connected with the collar 62 is a steering column lock actuator lever 70 (FIGS. 4A, 4B, 4D and 5D) which has a upwardly extending tab 72 on a first end 74 for engagement with the groove 64 of the collar 62. The steering column lock actuator lever 70 is mounted to the housing with a screw 76 for substantially planer movement in a plane parallel to lock pawl bed 34 (FIG. 4B). Movement of the collar 62 in response to insertion of a key into the ignition switch 18 between the key removed state (FIG. 4D) and the key inserted state (FIG. 5D) moves the tab 72 on end 74, thus pivoting the steering column lock actuator lever 70 so as to move end 78 between a lock actuator lever de-prepositions (FIGS. 4A–4D) in which the end 78 of the steering column lock actuator lever 70 depresses a contact tab 80 of a steering column lock lever 82, and a lock actuator lever release position (FIGS. 5A–5D) in which the end 78 of the steering column lock lever 70 is released from the depressed position.

The steering column lock lever 82 is pivotally mounted to a portion of the housing 16 for planer movement substantially perpendicular to the steering column axis 28, and substantially perpendicular to movement of the steering column lock actuator lever 70 planer movement (FIGS. 2 and 4B). A torsional spring 84 biases the lock lever 82 to a pawl lock position (FIGS. 5A–5D) in which an end 86 of the lock actuator lever extends toward the stop 40 of the lock pawl bed 34 (FIGS. 5B and 5D) so as to contact an edge face 88 of the lock pawl 32 (FIGS. 2 and 5B–5D) so as to prevent movement of the lock pawl 32 into engagement with the recesses 22 of the lock ring 20, as further described below.

Figure 3:
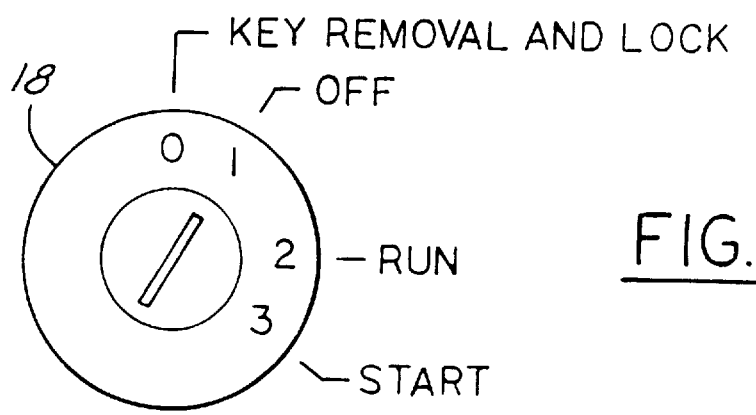
FIG. 3 is a schematic view of an ignition switch attached to a steering column housing showing various key positions.

In operation, the steering column lock assembly of the present invention prevents the steering column from locking until the key has been removed from the ignition switch. As seen in FIG. 3, the ignition switch 18 can be rotated between 4 positions with a key inserted therein, including a key removal position, an off position, a run position, and a start position. With the key removed from the ignition switch 18, the steering column lock assembly is in the position of FIGS. 4A–4D, 4D, thus locking the steering column 14 from rotation and preventing the steering wheel from being turned. In the steering column lock position, the lock pawl 32 is engaged with a lock recess 22 (FIG. 4A). Since the key is removed from the ignition switch 18, the collar 62 moves the tab 72 away from the steering column axis 28 (FIG. 4B) so that the steering column lock actuator lever 70 is in a depressed position against the tab 80 of the lock lever 82 overcoming the bias of spring 84 so as to rotate the lever 82 out of the path of the lock pawl 32. The tray 26 is in a left most position (FIG. 4A) with the lock pawl 32 abutting the stop 40 under the bias of spring 44 to engage the lock recess 22.

Figure 5D:
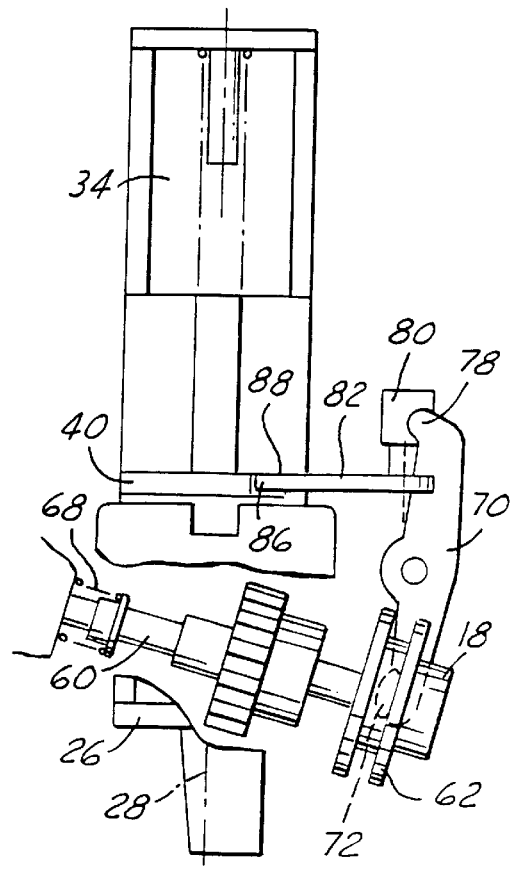

When a key is inserted into the ignition switch 18 (FIG. 5D), the collar 62 moves the tab 72 toward the axis 28 thus pivoting the steering column lock actuator lever 70 to an undepressed position allowing the steering column lock lever 82 to pivot so that end 86 can obstruct the path of lock pawl 32. In the start position (FIGS. 5A–5D), the tray 26 has been translated toward the right end FIG. 5A due to rotation of the ignition switch 18 and interaction of the pinion 58 with the rack 54 (FIGS. 5A–5C). During this translation of the tray 26, the lock pawl 32 disengages from the lock recess 22 of the lock ring 20 (FIGS. 5A and 5B). When the lock pawl 32 has moved pass the steering column lock lever 82, the lever 82 moves into the path of the lock pawl 32 under the bias of spring 84 (FIGS. 5A–5D). The lock pawl 32 is thus blocked by the steering column actuator lever 82 from reengaging the lock ring 20 so that the steering column 14 is unlocked and free to rotate.

Figure 6A:
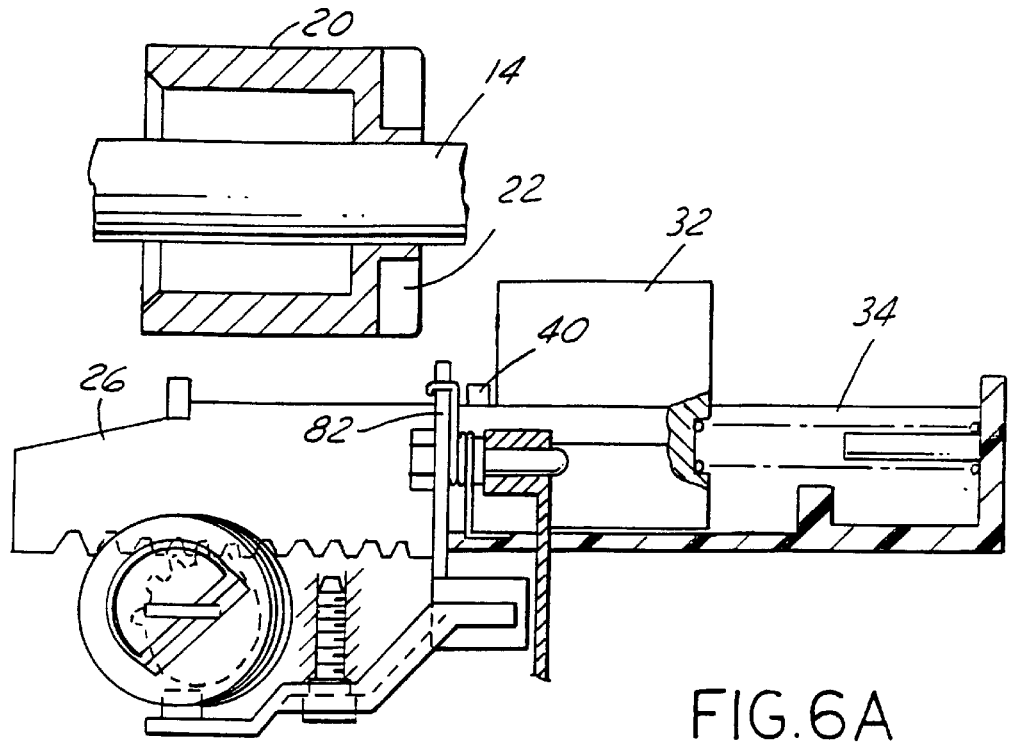
FIGS. 6A and 6B are side and plan views, respectively, showing a steering column lock assembly according to the present invention when an ignition switch is in a run position.
Figure 6B:
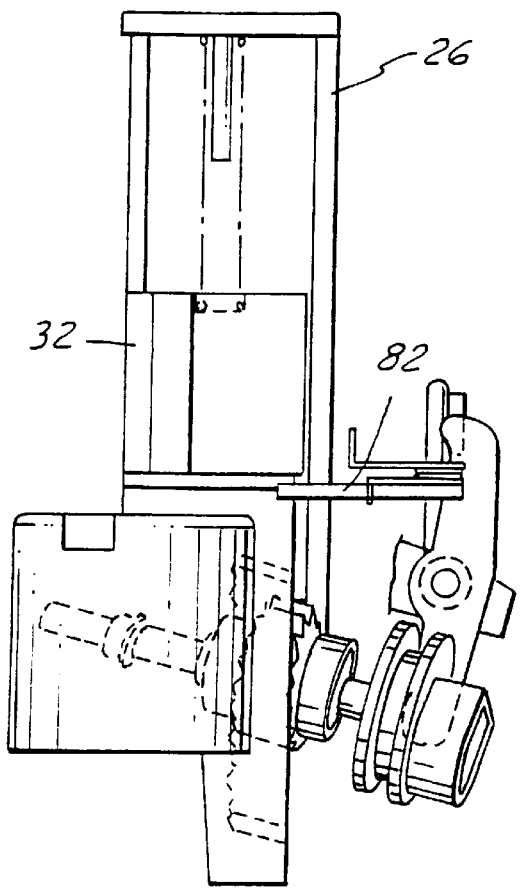
Figure 7A:
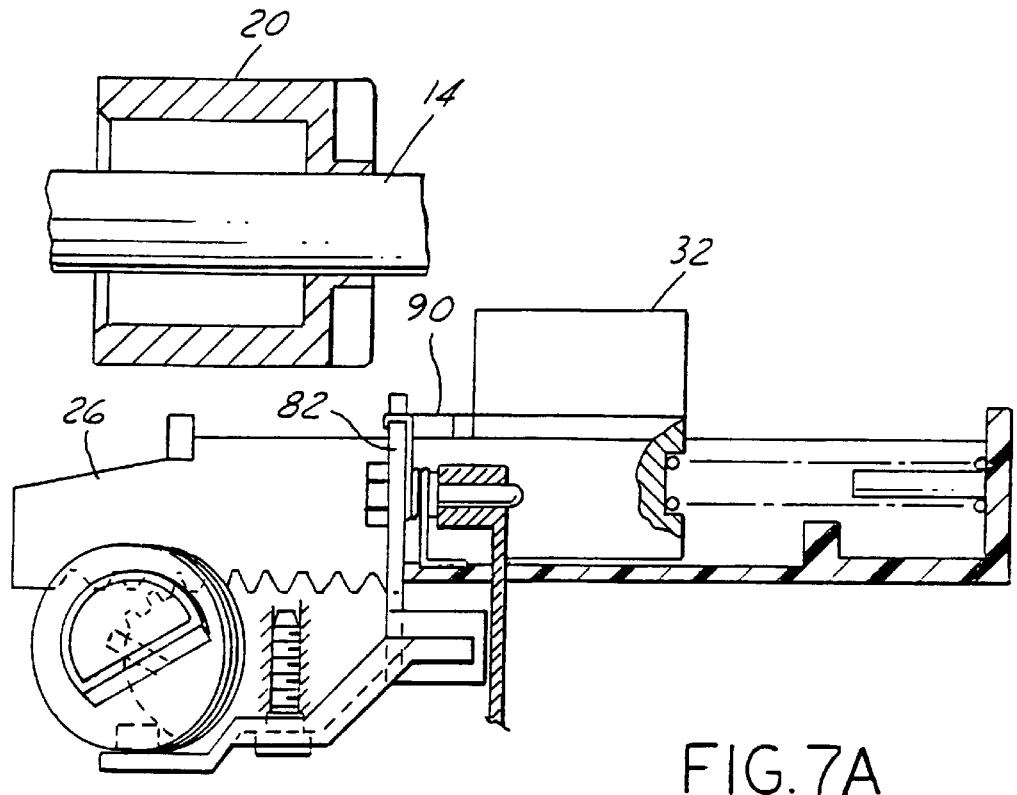
FIGS. 7A and 7B are side and plan views, respectively, showing a steering column lock assembly according to the present invention when the ignition switch is in a start position.
Figure 7B:
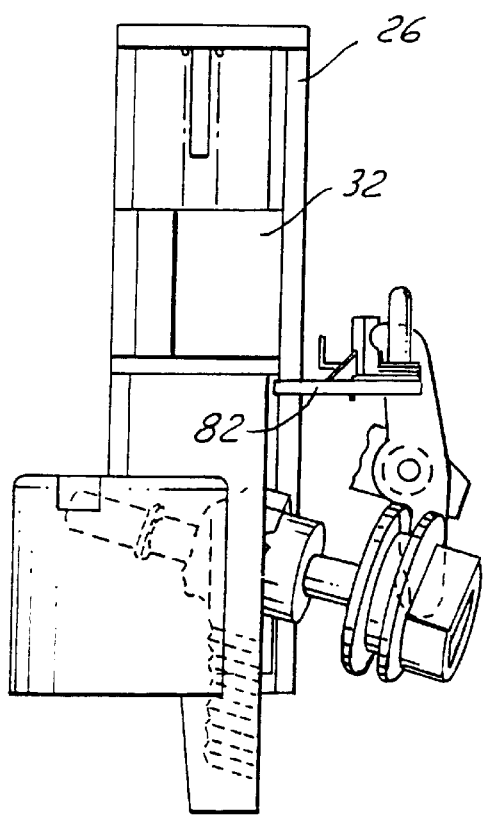

Upon rotation of the ignition switch 18 from the off position to the run position (FIG. 3), the tray 26 is furthered translated toward the right (FIG. 6A) thus leaving a space between the steering column lock lever 82 and the lock pawl 32 (FIGS. 6A and 6B). As the ignition switch is rotated to the start position (FIG. 3), the tray 26 is translated, through the rack and pinion motion of the teeth 54 and gear 58, respectively, to a right most position (FIG. 7A) in which a larger gap 90 opens between the pawl 32 and the steering column lock lever 82 (FIGS. 7A and 7B). The steering column lock lever 82 remains biased toward a blocking position to prevent the lock pawl 32 from reengaging the lock ring 20, and thus the steering column 14 is free to rotate (FIG. 7A).

During typical driving operation of an automotive vehicle, the ignition switch is in a run position (FIG. 3), and in the steering column lock assembly according to the present invention the tray 26 and lock pawl 32 are in the position shown in FIGS. 6A and 6B disengaged from the lock ring 20 to allow free rotation of the steering column 14.

The lock pawl 32 is prevented from engaging the recess 22 of the lock ring 20 by the stop 40 of the lock pawl bed 34, which is dictated by the position of the tray 26 (FIG. 6A). Should the tray 26, and thus the lock pawl 32 move to the left (FIG. 6) when the ignition switch 18 is in the run position, the steering column lock lever 82 will block the lock pawl 32 from engaging the lock recess 22 in the lock ring 20, thus preventing steering column 14 lock up.

Figure 8A:
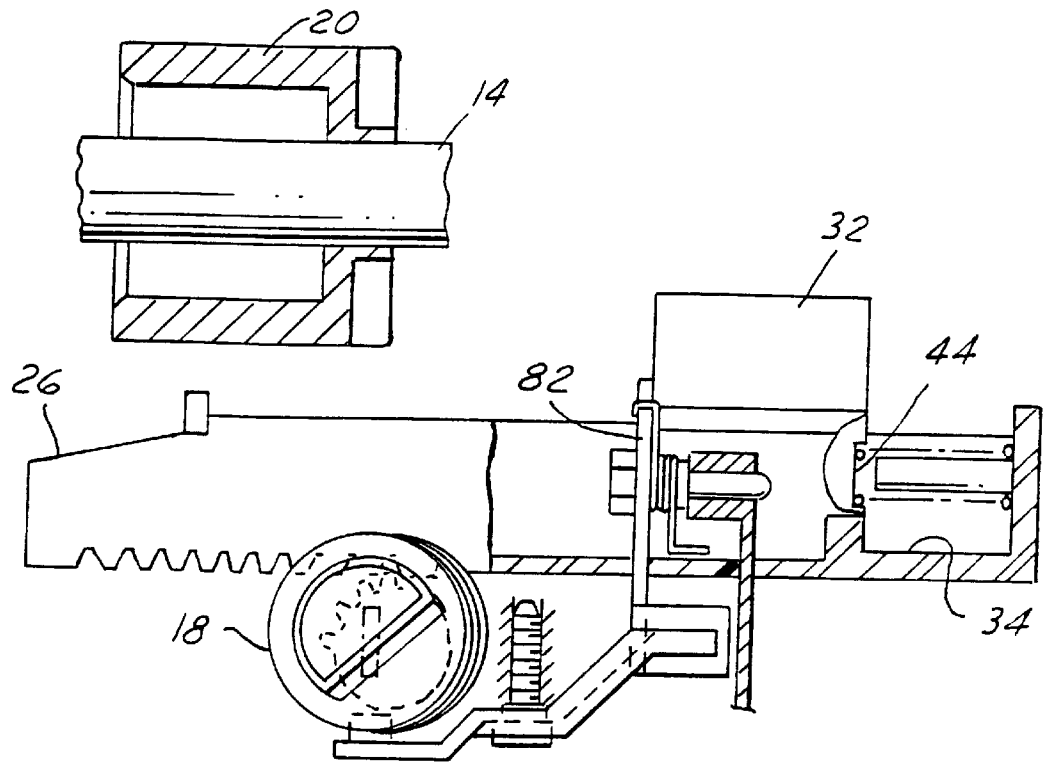
FIGS. 8A and 8B are side and plan views, respectively, showing a steering column lock assembly according to the present invention when an ignition switch has been moved from an off position to a key removal position.
Figure 8B:
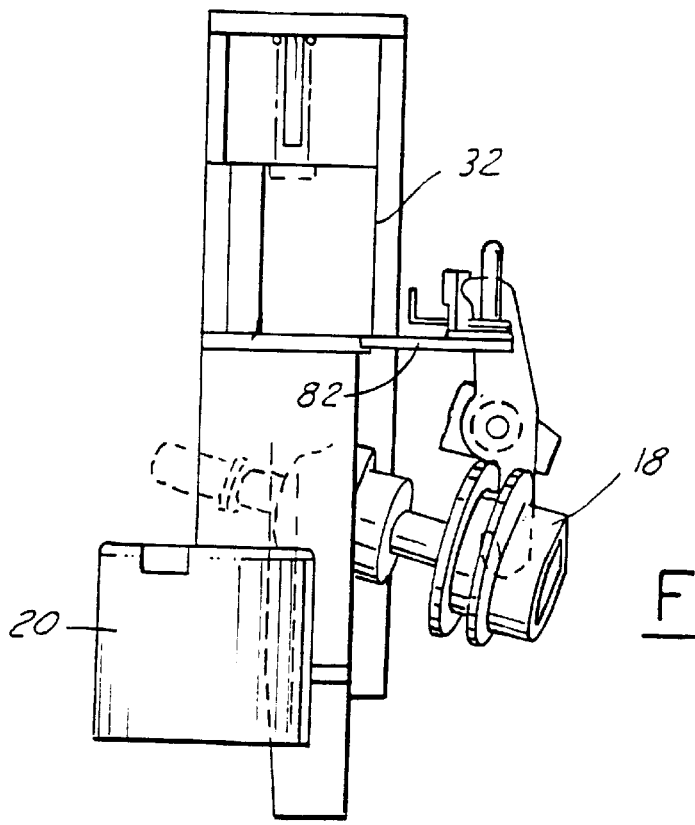

When the ignition switch 18 is rotated from the run position FIG. 3) to the key removal position, as typically occurs after operation of a vehicle is completed and a vehicle driver is leaving the vehicle, the tray 26 is rotated to the left most position (FIG. 8A), but the steering column lock lever 82 locks the lock pawl 32 from leftward movement (FIG. 8A), so that the lock pawl 32 slides in the lock pawl bed 34 relative to the tray 26 and compressing the spring 44. When the key is removed from the ignition switch 18, the steering column lock assembly of the present invention returns to the locked state of FIGS. 4A–4D, by outward movement of the collar 62 moving the tab 72 to rotate the lever 70 to the depressed position against member 80 of the steering column lock lever 82, thus rotating the lock lever 82 to an unblocking position (FIGS. 4B–4D) so that the lock pawl 32 is forced to the lock recess 22 of the lock ring 20 under the bias of spring 44 (FIG. 4A).

The present invention thus provides a steering column lock assembly which prevents a steering column from locking, after a key has been inserted into the ignition switch, until the key is removed from the ignition switch.

Although the preferred embodiment of the present invention has been disclosed, various changes and modifications may be made without departing from the scope of the invention as set forth in the appended claims.

We claim:

1. A steering column lock assembly for an automotive vehicle having a steering wheel connected to a steering column passing through a steering column housing to which an ignition switch is mounted, the steering column lock assembly comprising:

a lock ring adapted to be mounted to the steering column and having at least one lock recess on an end thereof;

a lock pawl movable between a lock position engaged in the lock recess and an unlock position disengaged from the at least one lock recess;

a tray adapted for slidable movement within the steering column housing generally parallel to the steering column, the tray having a lock pawl bed allowing the lock pawl to slide therein generally parallel to the steering column;

tray control means operatively connecting the ignition switch and the tray for moving the tray between at least two positions in which the lock pawl alternately engages and disengages the lock ring to prevent and allow, respectively, rotation of the steering column;

a lock lever fixed with respect to the steering column housing and movable between a blocking position preventing the lock pawl from moving into the at least one lock recesss on the lock ring, and an unblocking position allowing the lock pawl to enter the at least one lock recess; and a control lever fixed with respect to the steering column housing and operatively connected with the ignition switch for movement between a release position when a key is inserted into the ignition switch allowing the lock lever to move to the block position, and a depress position when the key is removed from the ignition switch forcing the lock lever to an unblock position to allow the lock pawl to move to the locked position.

2. The steering column lock assembly according to claim 1 wherein the control lever is adapted for pivotal mounting to the housing about a generally center point and has a first end operatively connected to the ignition switch and a second end operatively interactive with the lock lever.

3. The steering column lock assembly according to claim 2 wherein the control lever is operatively connected to the ignition switch by a collar adapted for attachment thereto, the collar having an annular groove for receiving a tab on a first end of the control lever so that axial movement of the ignition switch when a key is inserted therein to moves the control lever to the release position.

4. The steering column lock assembly according to claim 1 wherein the lock lever is adapted for mounting to the housing about a generally center point for pivotal movement generally perpendicular to the control lever and has a tab end for contact with the second end of the control lever and a blocking end having a finger protrudable into the tray for blocking movement of the lock pawl.

5. The steering column lock assembly according to claim 4 wherein the lock lever is biased to the blocking position by a torsional spring.

6. A steering column lock assembly for an automotive vehicle having a steering wheel connected to a steering column passing through a steering column housing to which an ignition switch is mounted, the steering column lock assembly comprising:

a lock ring adapted to be mounted to the steering column and having at least one lock recess on an end thereof;

a tray adapted for slidable movement within the steering column housing generally parallel to the steering column, the tray having a lock pawl bed in which a lock pawl is slidably disposed for generally parallel to the steering column between a lock position engaged in the at least one lock recess and an unlock position disengaged from the at least one lock recess, the tray further having a rack of teeth along a surface thereof;

a gear adaptably mounted to the ignition switch and operatively connected to the rack of teeth for converting rotational motion of the ignition switch into translational motion of the tray;

a lock ring lever fixed with respect to the steering column housing and movable between a blocking position preventing the lock pawl from moving into the at least one lock recesss on the lock ring, and an unblocking position allowing the lock pawl to enter the at least one lock recess; and a control lever fixed with respect to the steering column housing and operatively connected with the ignition switch for movement between a undepress position allowing the lock lever to move to the block position when a key is inserted into the ignition switch, and a depress position forcing the lock lever to an unblock position when the key is removed from the ignition switch.

7. The steering column lock assembly according to claim 6 wherein the control lever is adapted for pivotal mounting to the housing about a generally center point and has a first end operatively connected to the ignition switch and a second end operatively interactive with the lock lever.

8. The steering column lock assembly according to claim 7 wherein the control lever is operatively connected to the ignition switch by a collar adapted for attachment thereto, the collar having an annular groove for receiving a tab on a first end of the control lever so that axial movement of the ignition switch when a key is inserted therein to moves the control lever to the release position.

9. The steering column lock assembly according to claim 6 wherein the lock lever is adapted for mounting to the housing about a generally center point for pivotal movement generally perpendicular to the control lever and has a tab end for contact with the second end of the control lever and a blocking end having a finger protrudable into the tray for blocking movement of the lock pawl.

10. The steering column lock assembly according to claim 9 wherein the lock lever is biased to the blocking position by a torsional spring.

11. A steering column lock assembly for an automotive vehicle having a steering wheel connected to a steering column passing through a steering column housing to which an ignition switch mechanism is mounted, the steering column lock assembly comprising:

a key insertion sensing mechanism adapted to the ignition switch mechanism for sensing a key inserted state in which a key is inserted into the ignition switch mechanism and a key removed state in which the ignition switch mechanism does not have a key inserted therein;

a tray adapted for slidable movement within the steering column housing generally parallel to the steering column;

a key position indication mechanism for movement of the tray in correspondence with a rotational position of the ignition switch mechanism between a key removal position, an off position, a run position, and a start position, the key position indication mechanism comprising:

a rack of teeth along a surface of the tray;

a gear adaptably mounted to the ignition switch and operatively connected to the rack of teeth for converting rotational motion of the ignition switch into translational motion of the tray;

a lock ring adapted to be mounted to the steering column and having at least one lock recess on an end thereof;

a lock pawl sidably disposed in a lock pawl bed of the tray for movement generally parallel to the steering column between a lock position engaged in the at least one lock recess and an unlock position disengaged from the at least one lock recess to prevent and allow, respectively, rotation of the steering column;

a lock pawl control mechanism operatively connected with the key insertion sensing mechanism movable between a blocking position preventing the lock pawl from moving into the at least one lock recesss on the lock ring when the key sensing mechanism is in a key inserted state, and an unblocking position allowing the lock pawl to enter the at least one lock recess when the key sensing mechanism is in a key removed state.

* * * * *